United States Patent
Pascht et al.

(10) Patent No.: US 8,121,645 B2
(45) Date of Patent: Feb. 21, 2012

(54) SOFTWARE DEFINED RADIO BASE STATION AND CONFIGURATION METHOD

(75) Inventors: Andreas Pascht, Schorndorf (DE); Bernd Haberland, Stuttgart (DE); Denis Rouffet, Boulogne Billancourt (FR); Jens Strauss, Althengstett (DE)

(73) Assignee: Alcatel Lucent, Paris (FR)

( * ) Notice: Subject to any disclaimer, the term of this patent is extended or adjusted under 35 U.S.C. 154(b) by 1033 days.

(21) Appl. No.: 12/017,482

(22) Filed: Jan. 22, 2008

(65) Prior Publication Data

US 2008/0176518 A1 Jul. 24, 2008

(30) Foreign Application Priority Data

Jan. 22, 2007 (EP) ..................................... 07300737

(51) Int. Cl.
*H04M 1/00* (2006.01)
*H04B 1/38* (2006.01)

(52) U.S. Cl. .................... 455/561; 455/456.1; 455/63.1; 455/456.5

(58) Field of Classification Search .............. 455/456.1, 455/456.5, 507, 63.1, 67.11, 561, 404.2
See application file for complete search history.

(56) References Cited

U.S. PATENT DOCUMENTS

2005/0213516 A1* 9/2005 Ramirez et al. ............... 370/254

FOREIGN PATENT DOCUMENTS

| EP | 1 246 492 A1 | 10/2002 |
|---|---|---|
| EP | 1 283 995 B1 | 2/2003 |
| WO | WO 99/60715 A | 11/1999 |
| WO | WO 2005/099181 A | 10/2005 |

OTHER PUBLICATIONS

Khiem et al, "SDR approach to 3G cellular/PCS and position location services", Vehicular Technology Conference, 2004. VTC2004-Fall. 2004 IEEE 60$^{th}$ Los Angeles, CA USA, Sep. 26-29, 2004, Piscataway, NJ, USA, IEEE—Sep. 26, 2004, pp. 4103-4107, XP010790194.

* cited by examiner

Primary Examiner — Tuan Pham
(74) Attorney, Agent, or Firm — Fay Sharpe LLP

(57) ABSTRACT

The present invention relates to a method for configuring a base station (10) of a mobile communication network over a software defined radio module (12), that base station (10) serving at least one mobile terminal (20, 30, 40) over an air interface (52, 53, 54) served by that software defined radio module. When selecting the communication standard for the configuration of the base station (10) the characteristics of the air interface (52, 53, 54) are taken into account. The invention also relates to a base station (10) of a mobile communication network, that base station (10) serving at least one mobile terminal (20, 30, 40) over an air interface (52, 53, 54), that base station (10) comprising a configurable software defined radio module (12). The configurable software defined radio module (12) is adapted to take into account the characteristics of the air interface (52, 53, 54) when selecting the communication standard for the configuration of the base station (10).

6 Claims, 1 Drawing Sheet

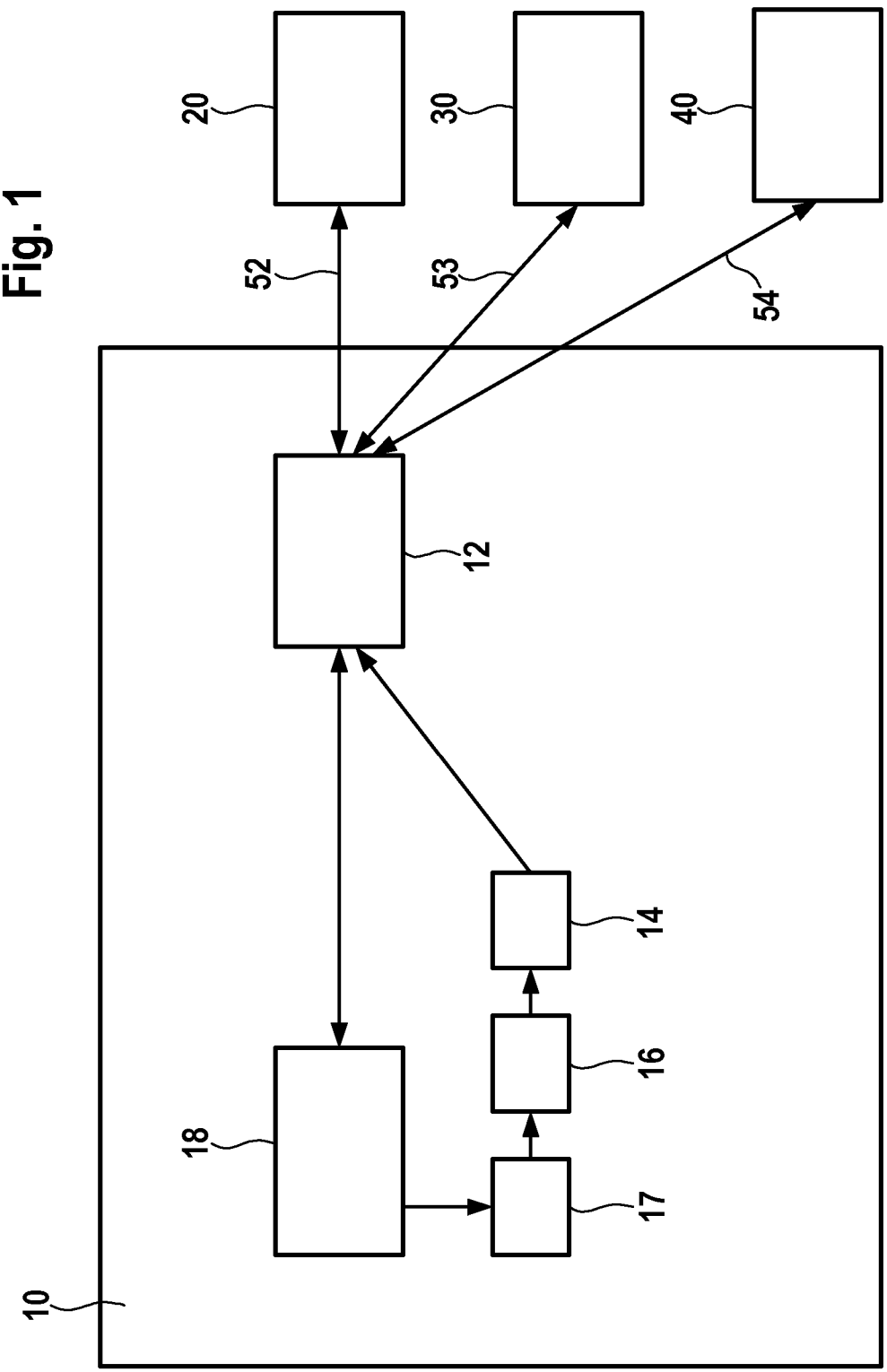

SOFTWARE DEFINED RADIO BASE STATION AND CONFIGURATION METHOD

The invention is based on a priority application EP 07 300 737.9 which is hereby incorporated by reference.

TECHNICAL FIELD

The present invention relates to a method for configuring a base station of a mobile communication network over a software defined radio module. The invention further relates to a base station of a mobile communication network comprising a configurable software defined radio module.

BACKGROUND OF THE INVENTION

In the European Patent Specification EP 1283995 B1 a management module for software defined radio is described. The management module manages the configuration and re-configuration of equipments in a communication network. A base station may be configured and may transmit and receive instructions to and from mobile terminals.

The invention has the object of providing a method for configuring a base station of a mobile communication network over a software defined radio module. It is another object of the invention to provide a configurable base station of a mobile communication network comprising a software defined radio module.

SUMMARY OF THE INVENTION

These objects and others that appear below are achieved by a method for configuring a base station of a mobile communication network over a software defined radio module, said base station serving at least one mobile terminal over an air interface served by said software defined radio module, whereby taking into account characteristics of said air interface when selecting the communication standard for the configuration of the base station and a base station of a mobile communication network, said base station serving at least one mobile terminal over an air interface, said base station comprising a configurable software defined radio module, whereby said configurable software defined radio module being adapted to take into account characteristics of said air interface when selecting the communication standard for the configuration of the base station.

Multi band, multi standard capable base stations or terminals are for example base stations or terminals with a software defined radio capability. Software defined radio is based on flexible software architecture. This allows the radio equipment to be re-configured for example by downloading or activating appropriate software. In other words software defined radio is configurable or re-configurable. A software defined radio equipment e.g. a mobile terminal or a base station can operate several different wireless communication standards.

According to one aspect of the invention a base station of a mobile communication network is configured over a software defined radio module taking into account characteristics of the air interface in between the base station and at least one mobile terminal served by the base station. This allows for selecting this standard of communication which is most appropriate for the air interface and its characteristics.

According to a preferred embodiment of the invention that characteristics of the air interface comprise information about the location of the mobile terminal within the service area of the base station. This embodiment has the advantage that characteristics of the air interface can be considered that depend on the location of the mobile terminal.

According to another preferred embodiment of the invention the characteristics of the air interface considered for the configuration of the base station comprise the robustness of the air interface. The robustness of the air interface is for example defined according to an interference and attenuation profile of the service area of the base station. When knowing the location of the mobile terminal and taking into account an interference and attenuation profile of the service area of the base station then interference and attenuation characteristics of the air interface can be found. Interference and attenuation profiles define among others the robustness of the air interface. Interference and attenuation patterns in the service area of the base station e.g. a cell served by the base station, give interference and attenuation values of the different locations within the service area.

According to another aspect of the invention the configuration of a base station may include the choice of a communication standard e.g. GSM (Global System for Mobile Communications), UMTS (Universal Mobile Telecommunications System) or other mobile communication standards.

According to another preferred embodiment of the invention the availability of a frequency over the air interface is taken into account when configuring the base station.

According to another embodiment of the invention information about the characteristics of the air interface are received from the one or more mobile terminals within the service area of the base station.

According to a preferred embodiment of the invention the capabilities of the one or more mobile terminals within the service area of the base station are taken into account when configuring the base station according to a communication standard. For example a UMTS standard is only chosen if the mobile terminal within service area of the base station that wishes to communicate is able to communicate over the UMTS standard.

According to another embodiment of the invention the quality of service requirements of the one or more mobile terminals within the service area of the base station are taken into account when configuring the base station. This has the advantage that the most appropriate communication standard can be chosen according to the application requirements that are to be transferred over the air interface. The standard can be chosen according to the quality of service requirements of the application to be transported over the air interface.

The invention allows for dynamic resource management based on the number and on the demands of the mobile terminals within the service area of the base station e.g. the radio cell. The invention allows the set-up of a self organizing radio access technology working on different radio standards like for example GSM, UMTS. This so called cognitive radio allows a network configuration according to the requirements of the mobile terminals. The configuration can be adapted according to the demands and the number of users in the service area of the base station e.g. the cell. This standard can be derived according to the required data rate in combination with the robustness of the air interface.

According to another aspect of the invention a configurable base station comprising a configurable software defined radio module takes into account characteristics of the air interface to the one or more mobile terminals within the service area of the base station.

The characteristics of the air interface comprise information about the location of the mobile terminal within the service area of the base station. This allows to take into account characteristics of the air interface that depend on the location of the mobile terminal within the service area of the base station.

According to a preferred embodiment of the invention the configurable base station takes into account the robustness of the air interface to the one or more mobile terminals in the service area of the base station. The robustness of the air interface is for example characterized by an interference and attenuation profile of the service area of the base station. An interference and attenuation profile gives the interference and attenuation values depending on the location in the service area of the base station. This has the advantage that as a selection guide the most robust communication standard can be used for the required communication needs.

BRIEF DESCRIPTION OF THE DRAWINGS

Other characteristics and advantages of the invention will become apparent in the following detailed description of a preferred embodiment of the invention illustrated by the accompanying drawing given by way of non limiting illustration.

FIG. 1 shows a schematic overview of a base station and mobile terminals communicating over an air interface.

DETAILED DESCRIPTION OF PREFERRED EMBODIMENTS

FIG. 1 shows a schematic overview of a base station 10, a mobile terminal 20 connected to the base station 10 over an air interface 52, a mobile terminal 30 connected to the base station over an air interface 53 and a mobile terminal 40 connected to the base station 10 over the air interface 54. The base station 10 comprises a software defined radio module 12, a software defined radio control module 14, an access service gateway 18, an access manager 17 and a cognitive radio module 16.

The mobile terminals 20, 30 and 40 preferably also comprise a software defined radio module to be also configurable. The mobile terminals 20, 30 and 40 provide information to the mobile node 10. The information provided by the mobile terminals 20, 30 and 40 comprise information about the demands and capabilities of the mobile terminals 20, 30 and 40. This information received from the mobile terminals 20, 30 and 40 at the software defined radio module 12 is sent to the access service gateway 18 within the base station 10. The access service gateway 18 is an element dealing with mobility, as especially applicable in a $3^{rd}$ generation long term evolution (3G LTE) architecture. The access service gateway 18 has part of the functions of GGSN (Gateway GPRS Support Node) in GPRS (General Packet Radio Service) or 3G ($3^{rd}$ generation mobile communication).

The access service gateway 18 passes this information to the access manager 17. The access manager 17 configures a cognitive radio tool box 16 where a dynamic configuration of the software defined radio module 12 is done via the library set of the software defined radio control module 14. This results in an optimized resource management in the mobile communication network.

The architecture shown in FIG. 1 allows for a dynamic standard management e.g. GSM, UMTS, UMTS LTE (long term evolution) based on the demands e.g. what kind of application, of the mobile terminals within the service area of the base station, e.g. within the radio cell. A dynamic usage of different available communication standards can be realized. Based on the mobile terminals and on the applications to be communicated the most robust communication standard to cover the application can be selected. The criteria of the standard selection can for example be defined by the following parameters. One parameter can for example be the application to be communicated over the air interface 52, 53 or 54, e.g. voice communication, data streaming communication, video mobile television etc. Another parameter can for example be the availability of a standard, e.g. at the mobile terminals 20, 30 and 40. Available standards are for example communication standards like GSM, UMTS, UMTS long term evolution etc. Another parameter can be the availability of the frequency to be used for a certain communication standard e.g. 900 MHz, 1800 MHz, 2100 MHz. Another parameter can be the quality of the air interface to the mobile terminal 20, 30, 40, for example given by an interference and attenuation profile. The interference and attenuation profile is preferably stored at the base station 10. Another parameter can be the distance of the mobile from the base station, or its location within the service area for example at the border of the service area or the proximity of another base station. Another criterion for the selection of the communication standard can also be the number of users in the service area.

For example for a pure voice application the GSM standard can be selected as a robust standard for low and medium data rates. As another example for a video application HSDPA (High-Speed Downlink Packet Access) could be selected for such high data rate application. As a selection guide the most robust communication standard can be used for the required quality of service. All this results in an optimized resource management within the mobile communication network.

The invention claimed is:

1. A method for configuring a base station of a mobile communication network over a software defined radio module, said base station serving at least one mobile terminal over an air interface served by said software defined radio module, the method comprising taking into account characteristics of said air interface when selecting the communication standard for the configuration of the base station, wherein the characteristics of the air interface comprise information about the location of the at least one mobile terminal within the service area of the base station and a robustness of the air interface according to an interface and attenuation profile of the service area of the base station.

2. The method according to claim 1, wherein said characteristics of the air interface an availability of a frequency over the air interface.

3. The method according to claim 1, further comprising receiving information about said characteristics of said air interface from the at least one mobile terminal.

4. The method according to claim 1, further comprising taking into account an ability of said at least one mobile terminal to communicate over the air interface according to the communication standard and/or the frequency to be selected.

5. The method according to claim 1, further comprising taking into account quality of service requirements of the at least one mobile terminal for the communication over the air interface.

6. A base station of a mobile communication network, said base station serving at least one mobile terminal over an air interface, said base station comprising a configurable software defined radio module, wherein said configurable software defined radio module being adapted to take into account characteristics of said air interface when selecting the communication standard for the configuration of the base station, wherein said characteristics of the air interface comprise information about the location of the mobile terminal within the service area of the base station and information about robustness of the air interface that is characterized by an interference and attenuation profile of the service area of the base station.

* * * * *